UNITED STATES PATENT OFFICE.

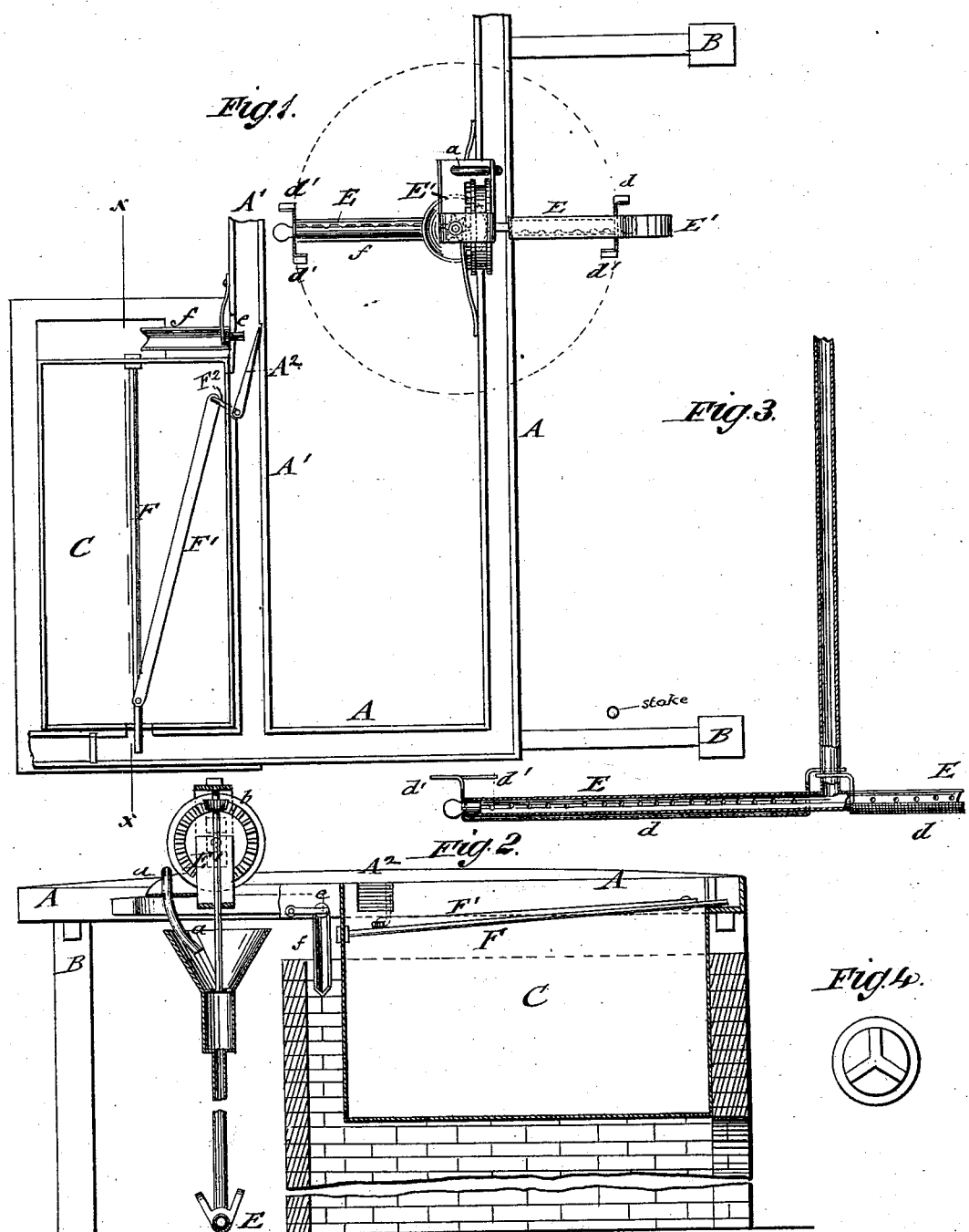

PERRY DICKSON, OF SPEARFISH CITY, DAKOTA TERRITORY.

IMPROVEMENT IN IRRIGATING APPARATUS.

Specification forming part of Letters Patent No. 208,078, dated September 17, 1878; application filed March 11, 1878.

*To all whom it may concern:*

Be it known that I, PERRY DICKSON, of Spearfish City, in the county of Lawrence and Territory of Dakota, have invented a new and Improved Irrigating Apparatus, of which the following is a specification:

In the accompanying drawing, Figure 1 represents a front view of my improved irrigating apparatus; Fig. 2, a vertical longitudinal section of the same on line $x\ x$, Fig. 1; Fig. 3, a detail section of the revolving sprinkler end; Fig. 4, a detail top view of the gate or valve for admitting water to the sprinkler.

Similar letters of reference indicate corresponding parts.

This invention is designed to furnish for farmers and growers of vegetables an improved irrigating apparatus by which the water may be distributed at any degree of temperature over the ground, either for the purpose of melting the snow and taking the frost out of the ground or for scalding the seeds of weeds and killing worms, grasshopper-eggs, and other insects, or for accelerating the growth of the plants, when the ground is prepared, by distributing water in a warm state during the cold nights, so as to supply a sufficient degree of heat to the ground, whereby the growing of the vegetables and other plants is accelerated in a high degree.

The invention consists of a number of conducting-troughs that are supported on posts in the fields and supplied with water from a heating-tank, the water being distributed by revolving sprinkler-arms, that receive the water by a siphon from the troughs, and are propelled by a revolving gear and wheels of a balanced carriage running on one side of the trough. The sprinklers are provided with semicircular covers having curved end arms, that form contact with stakes driven in the ground, so as to be thrown in front of the jets of water for reversing the motion of the sprinkler and its carriage at the end of the field.

The heater is arranged with an expansion-rod, that opens the induction-gate and admits cold water into the troughs when the water in the heating-tank rises above a certain temperature. If the water gets too hot the induction-gate opens a valve leading to the trough, that conveys water to the fire-place and extinguishes the fire.

By reference to the drawing, A represents a number of parallel water-troughs that are supported on horizontal brackets or arms of posts B, which are arranged in rows at suitable distances from each other in the field. The parts are preferably so arranged that they support the water-troughs on brackets at opposite sides, the troughs receiving their water supply from a heating-tank, C, in which the water received from higher grounds is heated up to the proper temperature. The induction-trough $A^1$ connects by a hinged gate, $A^2$, with the heating-tank, and also with the system of parallel water-troughs A. The water is taken up from the troughs by horizontal sprinkler-arms E, which revolve on a hollow pendent shaft turning in bearings of a traversing and balanced carriage, E', that is hung by a grooved wheel on one side of the trough, a siphon, $a$, taking the water from the trough to the upper funnel-shaped end of the sprinkler-tube, as shown in Fig. 2. The water passes through the vertical tube or penstock, and is discharged through the sprinklers, the sprinklers being perforated at opposite sides and revolved by the force of water thrown in jets from the same. A bevel-pinion, $b$, at the upper end of the shaft of the sprinklers engages a bevel-gear at the side of the grooved traversing-wheel, and propels thereby the sprinklers along the troughs over the field. To both sprinkler-arms are hung semicircular covers or troughs $d$, with curved end arms $d'$, which engage suitable posts driven into the field, so as to throw the covers in front of the perforations of the sprinkler-arms, and cause thereby the reversing of the same, so as to return to the place of starting, where they come in contact with similar stakes, so as to be reversed again, and keep up a continual travel from one side of the field to the other.

The operation of the sprinkler-arms may be more minutely described as follows, viz: Suppose the sprinkler-arms are pointing directly north and south, then a jet of water from the north end of the arm spouting west would propel east, and a jet from the south end spouting east would propel west. It will be obvious that the sprinkler-arms must be perforated on opposite sides, in order to propel in the same direction while the machine is traveling to one end of the field, during which covers or troughs are lying on top of the sprinkler-arms and not in use, being held there by curved arms on the inner ends, which rest against the vertical water-supply tube. When the sprinkler has arrived at the farther end of the field, one crank on the outer end of each cover comes in contact with pins or stakes driven in the ground, which trips both covers down in front of the jets of water. The covers are then converted into curved water-wheel buckets, receiving a full percussion impulse, and also a full reaction impulse, in the same direction, which is double the power of the reaction issues in the sprinkler-arms, and, notwithstanding the resistance of said issues, the covers, having twice the power of reaction, will run the sprinkler left-handed in spite of reaction only. The motion of the sprinkler is then reversed, and it starts back to the place of beginning, when the other little cranks on the outer ends of the covers come in contact with a pin or pins in the ground, which throws the cover on top of the sprinkler-arms, as before.

The heating-tank is provided with a metallic expansion-rod, F, which will expand to a certain degree when the temperature of the water exceeds a certain limit by the neglect of the fireman or for other causes. The expansion-rod is always immersed in the water in the heating-tank, and for this reason it is affected by the changes of the temperature of the water, so as to open the induction-valve more or less by the expansion of said rod. The latter is connected with the valve by means of a pivot-rod, $F^1$, and link $F^2$, as is shown in Fig. 1 of drawing. The opening of the gate admits cold water to pass in the trough $A^1$ around the heater into the irrigating-troughs, so as to cool the water therein and prevent the scalding of the crops. A very high degree of temperature in the heating-tank will open the induction-gate, so as to open a valve, e, in the side of the induction-trough and admit the water to an inclined trough, f, that leads down to the fire-place, so as to dampen and extinguish the fire. The expansion-rod acts automatically, and prevents any injury to the crops by sprinkling water of too high a temperature.

By the use of this irrigating apparatus the ground may be prepared in spring by melting the snow by the use of boiling water, which also kills the seeds of obnoxious weeds, insects, &c. While the ground is yet warm the seeds are sown and the fields supplied with warm water every cold night, which, combined with the heat of the sun during the day, accelerates the growth of plants and admits of their being raised without hot-houses in a remunerative manner for market purposes.

Having thus fully described my invention, I claim as new and desire to secure by Letters Patent—

1. The combination of the system of irrigating-troughs, conducting the water supplied from a heating-tank, with traversing and revolving sprinklers suspended from the troughs, substantially as and for the purpose described.

2. In an irrigating apparatus, the combination, with a balanced and traversing carriage running along the trough, of perforated sprinkler-arms, revolved by the water received by a siphon from the trough and transmitting motion to the carriage, substantially as specified.

3. The combination, in an irrigating apparatus, of revolving sprinkler-arms, having semicircular covers hung thereto, and curved end arms with fixed posts in the ends of the field, to produce a reversing of sprinkler, substantially as described.

4. The combination, in an irrigating apparatus, of the induction-trough, having swinging gate, with an expansion-rod and transmitting pivot-rod of the heating-tank, to prevent scalding of the crops by supplying cold water to the troughs, substantially as and for the purpose set forth.

5. The combination, in an irrigating apparatus, of the expansion-rod and connecting pivot-rod of the heating-tank with a swinging gate of the induction-trough and with a valve of the same, and supplementary trough leading to fire-place, to extinguish fire when temperature of water gets too high, substantially as specified.

PERRY DICKSON.

Witnesses:
F. P. HICKEY,
M. W. OLSON.